United States Patent [19]
Asaki

[11] 4,175,279
[45] Nov. 20, 1979

[54] FLASH UNIT FOR A CAMERA

[75] Inventor: James T. Asaki, Middletown, N.J.

[73] Assignee: International Telephone & Telegraph Corporation, Nutley, N.J.

[21] Appl. No.: 847,286

[22] Filed: Oct. 31, 1977

[51] Int. Cl.² ............................................. G03B 15/02
[52] U.S. Cl. ....................................... 362/18; 362/303
[58] Field of Search ........................... 362/3, 7, 16–18, 362/303

[56] References Cited

U.S. PATENT DOCUMENTS

| | | | |
|---|---|---|---|
| 2,734,435 | 2/1956 | Leonardi | 362/16 X |
| 2,783,679 | 3/1957 | Goldberg | 362/18 X |
| 2,979,601 | 4/1961 | McClees | 362/17 |
| 3,386,360 | 6/1968 | Nerwin | 362/18 X |
| 3,653,315 | 4/1972 | Fukuda | 362/3 X |
| 3,725,692 | 4/1973 | Miller et al. | 362/16 X |
| 3,774,510 | 11/1973 | Johnson | 362/18 X |
| 3,794,822 | 2/1974 | Bergmans | 362/18 |
| 3,878,385 | 4/1975 | Kingston | 362/17 X |
| 3,979,583 | 9/1976 | McCan | 362/16 X |
| 4,077,716 | 3/1978 | Gandini | 362/18 X |

Primary Examiner—Peter A. Nelson
Attorney, Agent, or Firm—John T. O'Halloran; Alfred C. Hill

[57] ABSTRACT

The unit includes a flexible filter contained in a casing and an actuating arrangement for the filter to position the filter in front of the flash lamp in an operative or first position thereof and to retract the filter from in front of the flash lamp in an inoperative or second position thereof.

20 Claims, 4 Drawing Figures

FLASH UNIT FOR A CAMERA

BACKGROUND OF THE INVENTION

This invention relates to flash units to be mounted on a camera and more particularly to filters for such flash units.

In various instances the light produced by a flash unit may need to be altered in amount or color by utilizing a filter interposed between the light source and the subject being photographed. One such instance is described below.

Cameras currently available utilize explosive flash bulbs to illuminate the subject in low ambient light level conditions. Some of these cameras contain electronic means to sense the flash intensity and to govern the film exposure time by operably and automatically closing the camera shutter when the film is exposed to a predetermined quantity of light.

When electronic flash units are employed with such cameras, the automatic light intensity control mechanism becomes inoperative since the flash duration of an electronic flash lamp is too rapid to permit the camera light sensing mechanism to respond. By the time the camera electronic eye senses sufficient light intensity to control the camera shutter mechanism the flash unit has already fired.

To overcome this disadvantage there is disclosed in the prior art, such as U.S. Pat. No. 3,843,878, a rigid filter housed within the flash device disposed between a flash lamp and a wall of the casing of the flash device. The filter is slidable by means of guide members provided on either the side walls of the casing, along a guide plate or on the side walls of the filter frame. The filter may be thereby shifted between a rest position and an operational position. By rest position is meant the position at which the filter is outside of the light path of the light rays coming from the flash lamp and faces the guide plate arranged substantially parallel to the optical path thereof. By operational position is meant the position at which the filter covers an opening in the casing for passing light coming from the flash lamp. The filter is pulled out from the casing toward the opening and pivoted to cover the opening of the casing. The filter in its rest position is located substantially parallel to an optical axis of the light path of the flash lamp and between the flash lamp and the casing. The filter, after being pulled toward the opening of the casing is pivoted to cover the opening for passing such light rays, thus preventing overexposure of the film when the subject to be photographed is close to the camera by substantially reducing the amount of projected light.

Another prior art flash unit employing filters to reduce the light from the flash lamp when the subject to be photographed is close to the camera is disclosed in the copending application of R. L. Taylor, Ser. No. 721,660, filed Sept. 8, 1976 and assigned to the same assignee as the present invention. In this copending application the filter arrangement is placed side by side with the flash unit and employs a pair of guide tracks on the top and bottom surfaces of the flash unit to allow the rigid filter to be slid in front of the flash lamp by an actuator when the filter is needed, or to permit the sliding the rigid filter away from the flash lamp when the filter is not needed.

The disadvantage of both of the above-cited prior art is that the filter is rigid and there is a considerable complexity to the mechanism involved for actuating the filter to be placed in front of the flash lamp and to retract the filter if not required.

SUMMARY OF THE INVENTION

An object of the present invention is to provide an improved means for controlling the quality or amount of light intensity that reaches the film during camera operation when an electronic flash unit is employed.

A feature of the present invention is the provision of a filter for a light source comprising in combination a translucent flexible filter material; and an arrangement for actuating the filter material into an operative position and to retract the filter material into an operative position.

Another feature of the present invention is the provision of a flash unit to be mounted on a camera, the unit including a casing having therein a light source comprising: a translucent flexible filter contained in the casing; and an actuating arrangement for the filter to position the filter in front of the light source in a first or operative position thereof and to retract the filter from in front of the light source in a second or inoperative position thereof.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

Figure 1:
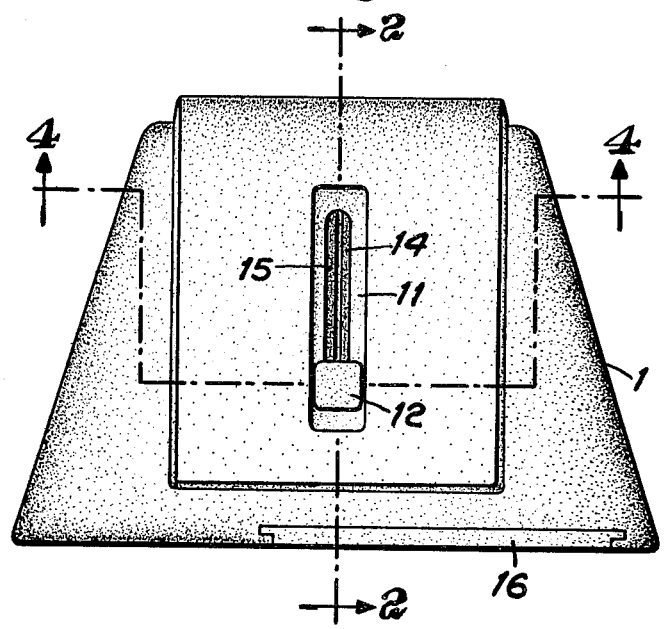
FIG. 1 is a top view of the flash unit in accordance with the principles of the present invention.

Referring to FIGS. 1, 2, 3 and 4, the electronic flash unit which is to be mounted on a camera, for example a Kodak Self-Developing Camera having a truncated configuration when viewed from the top includes a casing 1 having a truncated configuration as illustrated in FIG. 1 when viewed from the top to mate with the top truncated configuration of the camera upon which the flash unit is mounted. A light source, for example a tubular element shown as a flash lamp 2 in FIGS. 2 and 3 appropriately located in a reflector member 3 so as to focus the light emitted by the lamp 2 through window 4 toward the subject to be photographed.

Figure 2:
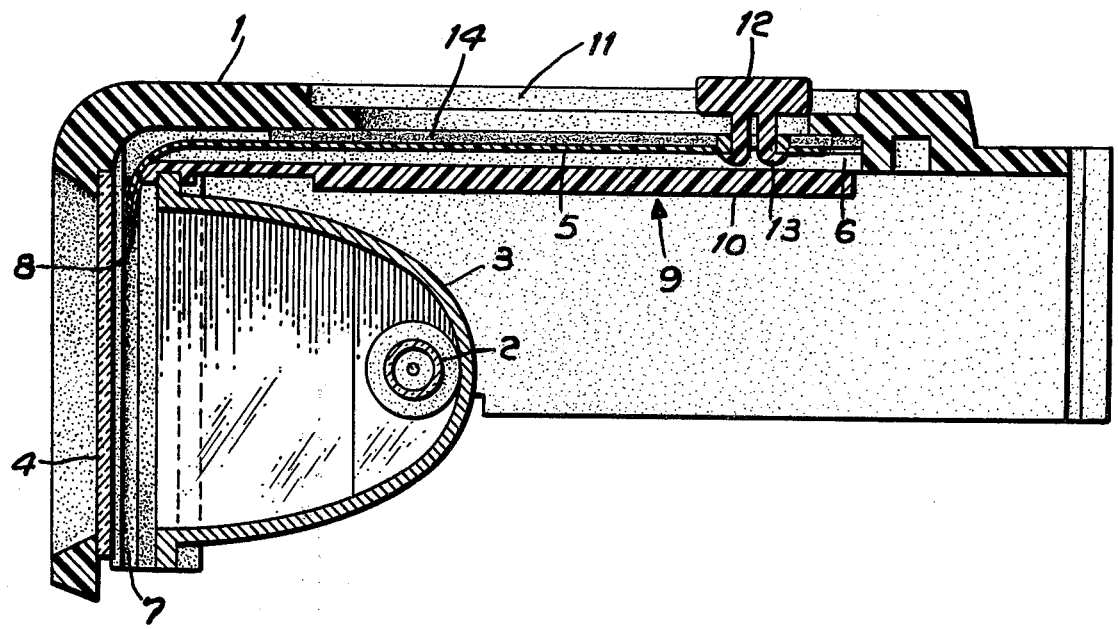
FIG. 2 is a partial enlarged cross sectional view taken along line 2—2 of FIG. 1 illustrating the internal relationship of components of the flash unit with respect to the translucent flexible filter with the filter in its inoperative or second position in accordance with the principle of the present invention.
Figure 3:
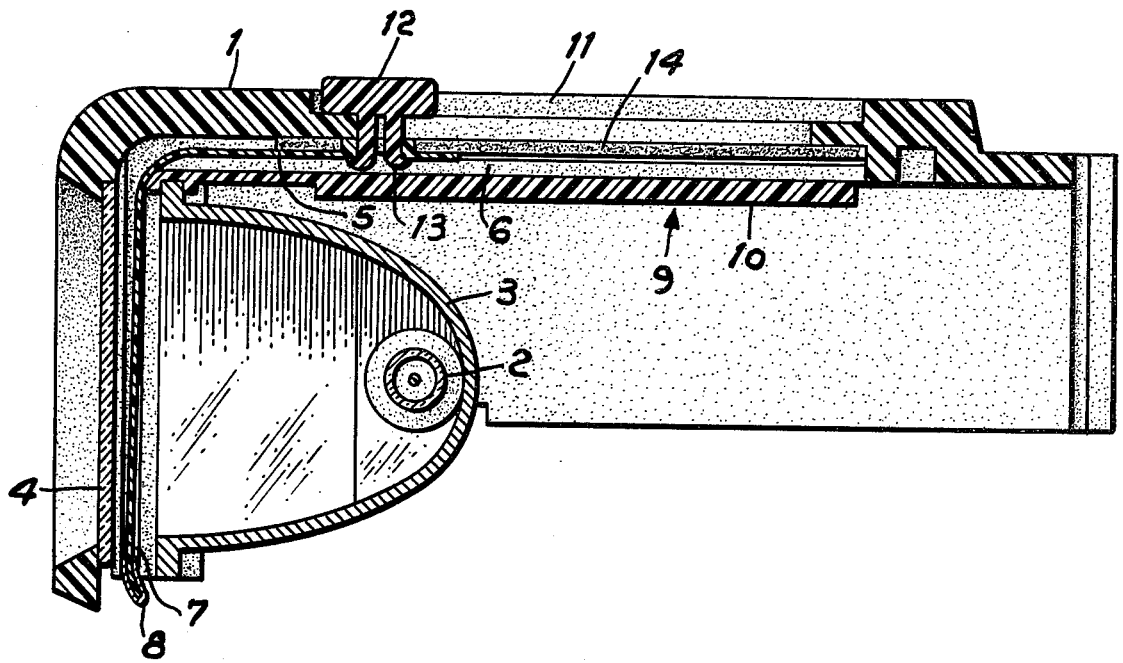
FIG. 3 is a partial enlarged cross sectional view taken along line 2—2 of FIG. 1 illustrating the internal relationship of components of the flash unit with respect to the translucent flexible filter with the filter in its operative or first position in accordance with the principles of the present invention.
Figure 4:
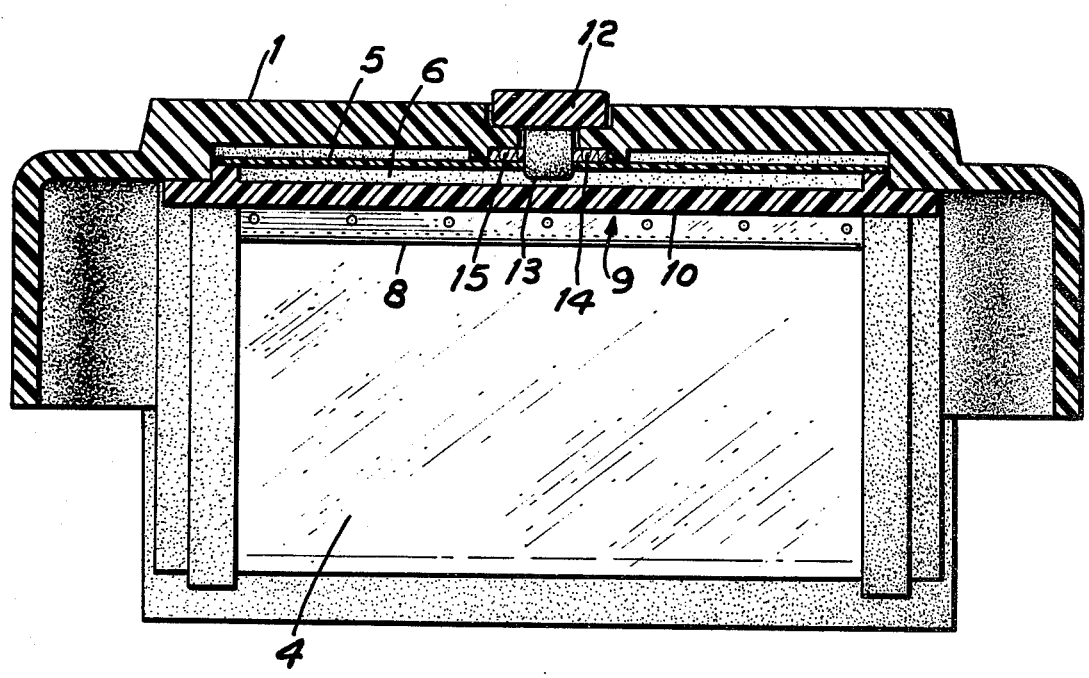
FIG. 4 is an enlarged cross sectional view taken along line 4—4 of FIG. 1 looking inside the casing toward the light emitting window with the light source reflector member removed in accordance with the principle of the present invention.

A translucent flexible filter 5 is wholly contained in casing 1. Both longitudinal edges of filter 5 are contained in track 6 adjacent the top of casing 1 and a mating track 7 between the reflector member 3 and window 4. The junction of tracks 6 and 7 are rounded to enable filter 5 to make a right angle turn when actuated between a first or operative position as shown in FIG. 3 and a second or inoperative position as shown in FIG. 2. Tracks 6 and 7 both guide filter 5 and prevents filter 5 from deviating from its normal path of travel when actuated. Filter 5 may be composed of a translucent flexible polycarbonate or the like having light transmission characteristics to produce the desired intensity or color filtering action on the light emitted from lamp 2. In addition the transverse edge of filter 5 adjacent window 4 has clamped thereto a metal member 8 to stiffen this edge on filter 5 to permit movement thereof in track 7 without buckling. The member 8 in both positions of filter 5 is hidden from view of light emitted from lamp 2 by casing 1 at the top and bottom of window 4.

An actuating arrangement controls filter 5 to be moved to a first or operative position where filter 5 is in front of reflector member 3 and lamp 2 as shown in FIG. 3. This same arrangement moves filter 5 to a second or inoperative position where filter 5 is retracted from in front of reflector member 3 and lamp 2 into a storage compartment 9 defined by member 10 and casing 1 as shown in FIG. 2.

The actuating arrangement includes a slot 11 in the top of casing 1, a knob 12 disposed in slot 11, an extension 13 coupled to knob 12 and extending into casing 1 for connection to filter 5. Slot 11 is covered by two separated pieces of felt or screen type of material 14 and 15 which will not hinder movement of knob 12 and extension 13 and will protect filter 5 from exterior contamination. Material 14 and 15 is similar to the material employed in slide volume control members.

Member 16 of FIG. 1 enables access to a compartment (not shown) containing two AA alkaline batteries connected to the camera upon which the flash unit is mounted and employed in the circuit controlling the flash lamp 2.

When the subject to be photographed is from six to eight feet (1.8 to 2.5 meters) away from the camera, filter 5 would be actuated to the position illustrated in FIG. 2 and if the subject to be photographed is from four to six feet (1.2 to 1.8 meters) away from the camera, filter 5 would be actuated to the position shown in FIG. 3.

While I have described above the principles of my invention in connection with specific apparatus it is to be clearly understood that this description is made only by way of example and not as a limitation to the scope of my invention as set forth in the objects thereof and in the accompanying claims.

I claim:

1. A filter for a light source comprising in combination:
   a translucent flexible filter material; and
   means for actuating said filter material into an operative position in front of said light source and to retract said filter material into an inoperative position removed from in front of said light source;
   said means for actuating including
      a pair of tracks, each of said pair of tracks being associated with a different one of the longitudinal edges of said filter material to contain and guide said filter material when it is actuated.

2. A filter according to claim 1, wherein
said filter material includes
   a translucent flexible polycarbonate.

3. A filter according to claim 1, wherein
said operative position is disposed at right angles to said inoperative position.

4. A filter according to claim 1, wherein
said operative position includes said filter material positioned in front of said light source; and
said inoperative position includes said filter material retracted from in front of said light source.

5. A filter according to claim 4, wherein
said means for actuating further includes
   a knob having an extension thereon connected to said filter material intermediate the longitudinal edges thereof capable of sliding in a slot of a casing adjacent said inoperative position, said casing enclosing said light source and having a window to emit light from said light source and said filter material is disposed between said window and said light source when said filter material is in said operative position.

6. A filter according to claim 5, wherein
said filter material includes
   a metal edge fastened to said filter material remote from said knob, said metal edge being disposed in a perpendicular relation with and engaging said pair of tracks to enable movement of said filter material in said pair of tracks without buckling.

7. A filter according to claim 5, wherein
said filter material is contained within said casing in both said operative and inoperative positions.

8. A filter according to claim 1, wherein
said filter material in said operative position and said inoperative position is contained within an enclosed casing containing said light source and having a window to emit light from said light source, said filter material being disposed between said window and said light source when said filter material is in said operative position.

9. A flash unit to be mounted on a camera, said unit including a casing having therein a light source comprising:
   a translucent flexible filter contained in said casing; and
   an actuating arrangement for said filter to position said filter in front of said light source in a first position thereof and to retract said filter from in front of said light source in a second position thereof;
   said arrangement including
      a pair of tracks formed in said casing, each of said pair of tracks being associated with a different one of the longitudinal edges of said filter to cause said filter to make a right angle turn when actuating said filter between said first and second positions.

10. A unit according to claim 9, further including
a window in said casing in front of said light source; and
said filter is disposed between said window and said light source in said first position.

11. A unit according to claim 10, wherein said filter includes
a metal member fastened to said filter adjacent said window, said metal member being disposed in a perpendicular relation with and engaging said pair of tracks to enable movement of said filter in said pair of tracks without buckling, said metal member being hidden from view by said casing below said window when in said first position, and said metal member being hidden from view of said light source when in said second position.

12. A unit according to claim 11, wherein said filter is composed of a translucent flexible polycarbonate.

13. A unit according to claim 12, wherein said actuating arrangement includes
   a slot in said casing adjacent said second position,
   a knob disposed in said slot, and
   an extension coupled to said knob extending into said casing and connected to said filter intermediate the longitudinal edges thereof remote from said metal member.

14. A unit according to claim 13, wherein said casing is truncated when viewed from the top to mate with the top configuration of said camera upon which said flash unit is mounted.

15. A unit according to claim 9, wherein said actuating arrangement includes
   a slot in said casing adjacent said second position,
   a knob disposed in said slot, and
   an extension coupled to said knob extending into said casing and connected to said filter intermediate the longitudinal edges thereof remote from said light source.

16. A unit according to claim 15, wherein said filter is composed of a translucent flexible polycarbonate.

17. A unit according to claim 16, wherein said casing is truncated when viewed from the top to mate with the top configuration of said camera upon which said flash unit is mounted.

18. A unit according to claim 9, wherein said filter is composed of a translucent flexible polycarbonate.

19. A unit according to claim 18, wherein said casing is truncated when viewed from the top to mate with the top configuration of said camera upon which said flash unit is mounted.

20. A unit according to claim 9, wherein said casing is truncated when viewed from the top to mate with the top configuration of said camera upon which said flash unit is mounted.

* * * * *